(12) United States Patent
Yamaji et al.

(10) Patent No.: US 9,194,025 B2
(45) Date of Patent: Nov. 24, 2015

(54) METHOD OF MANUFACTURING SINTERED SILVER ALLOY BODY AND COPPER OXIDE-CONTAINING CLAY-LIKE COMPOSITION

(75) Inventors: Takashi Yamaji, Sanda (JP); Yasuo Ido, Kobe (JP); Shinji Otani, Kobe (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 1055 days.

(21) Appl. No.: 13/279,767

(22) Filed: Oct. 24, 2011

(65) Prior Publication Data

US 2012/0098168 A1   Apr. 26, 2012

(30) Foreign Application Priority Data

Oct. 25, 2010   (JP) ................................. 2010-239017

(51) Int. Cl.

| | | |
|---|---|---|
| *C22C 5/08* | (2006.01) | |
| *C08L 1/02* | (2006.01) | |
| *C08L 3/02* | (2006.01) | |
| *C08L 89/06* | (2006.01) | |
| *C08L 91/06* | (2006.01) | |
| *C09J 101/02* | (2006.01) | |
| *C09J 101/28* | (2006.01) | |
| *C09J 103/02* | (2006.01) | |
| *C08L 1/28* | (2006.01) | |
| *C09J 189/06* | (2006.01) | |
| *C09J 199/00* | (2006.01) | |
| *C08K 3/08* | (2006.01) | |
| *C08K 3/22* | (2006.01) | |

(52) U.S. Cl.
CPC ... *C22C 5/08* (2013.01); *C08L 1/02* (2013.01); *C08L 1/28* (2013.01); *C08L 3/02* (2013.01); *C08L 89/06* (2013.01); *C08L 91/06* (2013.01); *C09J 101/02* (2013.01); *C09J 101/28* (2013.01); *C09J 103/02* (2013.01); *C09J 189/06* (2013.01); *C09J 199/00* (2013.01); *C08K 2003/0806* (2013.01); *C08K 2003/2248* (2013.01)

(58) Field of Classification Search
USPC .............................................. 419/22; 75/252
See application file for complete search history.

(56) References Cited

U.S. PATENT DOCUMENTS

| 3,844,027 A * | 10/1974 | Hagen et al. .................. 228/209 |
| 2007/0248801 A1 * | 10/2007 | Nakao ........................... 428/210 |

FOREIGN PATENT DOCUMENTS

| JP | H4-26707 A | 1/1992 |
| JP | 05-174620 A | 7/1993 |
| JP | 05-263103 A | 10/1993 |
| JP | 3274960 B2 | 9/1997 |
| JP | 2001-191696 A | 7/2001 |
| JP | 2002-220604 A | 8/2002 |
| JP | 4265127 B2 | 8/2002 |
| JP | 2002-356702 A | 12/2002 |
| JP | 2005-280304 A | 10/2005 |
| JP | 2006-183076 A | 7/2006 |
| JP | 2008-138287 A | 6/2008 |

OTHER PUBLICATIONS

Office Action mailed Sep. 24, 2014, issued for the Japanese patent application No. 2010-239017 and English translation thereof.
Office Action mailed on May 26, 2015 issued for corresponding Japanese Patent Application No. 2010-239017.

* cited by examiner

*Primary Examiner* — George Wyszomierski
*Assistant Examiner* — Ngoclan T Mai
(74) *Attorney, Agent, or Firm* — Locke Lord LLP (57) ABSTRACT

A method of manufacturing a sintered silver alloy body of the present invention includes steps of adding copper oxide to a silver-containing clay-like composition that contains silver-containing metal powder containing silver, a binder, and water to manufacture a clay-like composition for forming a sintered silver alloy body; making an object by making the clay-like composition for forming a sintered silver alloy body into an arbitrary shape; and baking the object in a reduction atmosphere or a non-oxidizing atmosphere after the object is dried.

5 Claims, 4 Drawing Sheets

METHOD OF MANUFACTURING SINTERED SILVER ALLOY BODY AND COPPER OXIDE-CONTAINING CLAY-LIKE COMPOSITION

BACKGROUND OF THE INVENTION

1. Field of the Invention

The present invention relates to a method of manufacturing a sintered silver alloy body and a copper oxide-containing clay-like composition used for the method of manufacturing a sintered silver alloy body.

Priority is claimed on Japanese Patent Application No. 2010-239017, filed Oct. 25, 2010, the content of which is incorporated herein by reference.

2. Description of Related Art

In the past, jewelry, artistic handcrafts, and the like made of silver represented by, for example a ring or the like, have been manufactured by casting or forging a silver-containing material in general. However, in recent years, silver clay (a silver-containing clay-like composition) including silver powder has become commercially available, and a method has been suggested that manufactures silver jewelry or artistic handcrafts having an arbitrary shape by making the silver clay into an arbitrary shape and then baking the silver clay (for example, see Patent Document 1). According to this method, silver clay can be freely shaped in the same manner as in general clay work, and it is possible to very easily manufacture jewelry, artistic handcrafts and the like made of silver by drying a shaped body obtained by shaping and then baking the shaped body using a furnace.

Generally, the silver clay described in Patent Document 1 is obtained by adding a binder and water and optionally further adding a surface active agent or the like to the powder of pure silver (pure Ag) and then kneading the mixture. However, when the silver clay is made using silver powder of pure Ag and then heated so as to manufacture a sintered silver alloy body, there is a problem in that the mechanical properties of the obtained sintered silver alloy body deteriorate since the strength of pure Ag itself is weak.

To solve the above-described problem of the mechanical properties, another method has also been suggested that manufactures a sintered silver alloy body, which is so-called sterling silver, by shaping and then baking silver clay obtained by constituting silver powder with a silver alloy that includes Ag in a component ratio of 92.5 mass % and, furthermore, copper (Cu) or the like, and adding a binder or the like to this silver powder and kneading the mixture (for example, see the 'Example' section or the like in Patent Document 2).

Patent Document 1: Japanese Patent No. 4265127
Patent Document 2: Japanese Patent No. 3274960

SUMMARY OF THE INVENTION

However, although the mechanical properties of silver clay including an Ag—Cu alloy are more improved compared to a sintered silver alloy body using the silver powder of pure Ag as described in Patent Document 2, there is a problem in that the hue of the silver clay easily deteriorates since Cu included in the silver clay is easily altered. Specifically, when the silver clay including sterling silver is stored at room temperature in the atmosphere, it is observed that the silver clay becomes discolored at a point of time only several days after the manufacturing date of the silver clay, and not only the surface but the inside thereof is discolored. Accordingly, it is necessary to be careful with a method of storing the above-described silver clay.

When the silver clay is manufactured using alloy powder, it is necessary to manufacture the alloy powder by manufacturing the alloy and then performing atomization or the like. Therefore, there is a problem in that the manufacturing costs of the silver clay including an Ag—Cu alloy or the like increases.

Accordingly, it is difficult to simply manufacture a sintered silver alloy body having excellent mechanical properties at a low cost.

The present invention has been made in consideration of the above circumstances, and an object thereof is to provide a method of manufacturing a sintered silver alloy body, which enables the simple manufacture of a sintered silver alloy body that has excellent tensile strength, bending strength (mechanical properties), elongation, and the like at a low cost, and to provide a copper oxide-containing clay-like composition that is suitable for the method of manufacturing the sintered silver alloy body.

The present inventor carried out a thorough investigation to solve the above problems. As a result, the inventor acquired the knowledge that, by adding copper oxide to silver clay as base material, it is possible to suppress the discoloration over time of copper-containing silver clay and to greatly improve mechanical properties of a sintered silver alloy body that is obtained by baking the silver clay.

The present invention has been made based on the above knowledge and has the constitution shown below.

The method of manufacturing a sintered silver alloy body of the present invention includes steps of adding copper oxide to a silver-containing clay-like composition that contains silver-containing metal powder containing silver, a binder, and water to manufacture a clay-like composition for forming a sintered body; making an object by making the clay-like composition for forming a sintered body into an arbitrary shape; and baking the object in a reduction atmosphere or a non-oxidizing atmosphere after the object is dried.

The method of manufacturing a sintered silver alloy body constituted in this manner includes the step of adding copper oxide in which copper oxide is added to the silver-containing clay-like composition that contains the silver-containing metal powder, the binder, and water to manufacture a clay-like composition for forming a sintered body. Accordingly, the manufactured clay-like composition for forming a sintered body includes silver and copper oxide. Herein, since the copper oxide is chemically stable compared to a metal Cu, there is less concern that the copper oxide will be easily altered (the acid value of the copper ions changes) in the atmosphere. Therefore, it is possible to suppress the discoloration over time of the clay-like composition for forming a sintered body, which is obtained in the step of adding copper oxide. In addition, the discoloration over time of a copper oxide-containing clay-like composition itself is also suppressed.

The method of manufacturing a sintered silver alloy body also includes steps of making an object by making the clay-like composition for forming a sintered body obtained in the step of adding copper oxide into an arbitrary shape, and baking the object in a reduction atmosphere or a non-oxidizing atmosphere after the object is dried. Accordingly, the manufactured sintered silver alloy body includes silver and copper. Therefore, it is possible to improve the mechanical properties of the sintered silver alloy body.

In addition, it is possible to remove the binder by using oxide included in the copper oxide, whereby baking can be promoted.

In this manner, in the invention, it is possible to promote the improvement of the mechanical properties of the sintered silver alloy body by adding copper oxide to the silver clay as base material.

Herein, in the step of adding copper oxide, the clay-like composition for forming a sintered body may be manufactured by mixing the copper oxide-containing clay-like composition containing copper oxide powder, a binder, and water with the silver-containing clay-like composition.

In this case, by mixing the silver-containing clay-like composition that contains a silver-containing metal powder containing silver, a binder, and water with the copper oxide-containing clay-like composition that contains copper oxide powder, a binder, and water, it is possible to simply manufacture the clay-like composition for forming a sintered body including silver and copper oxide. In addition, by adjusting a mixing ratio between the copper oxide-containing clay-like composition and the silver-containing clay-like composition, it is possible to remove the binder by using oxide included in the copper oxide-containing clay-like composition and to omit pre-baking performed in the atmosphere.

Alternatively, in the step of adding copper oxide, the clay-like composition for forming a sintered body may be manufactured by adding copper oxide powder to the silver-containing clay-like composition and optionally further adding a binder and water.

In this case, by adding the copper oxide powder to the silver-containing clay-like composition that contains silver-containing metal powder containing silver, a binder, and water, and optionally further adding a binder and water, it is possible to manufacture the clay-like composition for forming a sintered body. Moreover, by adjusting the amount of the copper oxide powder, the binder, and water to be added, it is possible to remove the binder by using oxide included in the copper oxide powder in the baking step. Accordingly, it is possible to omit pre-baking performed in the atmosphere and to secure the formability of the clay-like composition for forming a sintered body.

The copper oxide-containing clay-like composition of the present invention includes the copper oxide powder, the binder, and water.

By mixing the copper oxide-containing clay-like composition having this constitution with the silver-containing clay-like composition, it is possible to simply manufacture the clay-like composition for forming a sintered body including silver and copper oxide. In addition, since the copper oxide-containing clay-like composition contains chemically stable copper oxide, the discoloration of the copper oxide-containing clay-like composition itself is also suppressed.

Herein, a mixing ratio (mass ratio) B/A between the copper oxide powder (A) and the binder and water (B) is preferably in a range of $2/10 \leq B/A \leq 3/10$.

In this case, since the mixing ratio (mass ratio) B/A between the copper oxide powder (A) and the binder and water (B) is $B/A \geq 2/10$, it is possible to manufacture the clay-like composition for forming a sintered body having excellent formability, by simply mixing silver clay with the copper oxide powder, the binder, and water. In addition, since the mixing ratio (mass ratio) B/A between the copper oxide powder (A) and the binder and water (B) is $B/A \leq 3/10$, the binder is not included more than is necessary, and it is possible to manufacture a sintered silver alloy body having excellent mechanical properties by reliably removing the binder during the baking step.

It is preferable that the copper oxide powder include CuO powder.

In this case, since the copper oxide powder includes the CuO powder which is a relatively stable compound, it is possible to reliably suppress the discoloration of the copper oxide-containing clay-like composition itself and the discoloration of the clay-like composition for forming a sintered body which is obtained by mixing the copper oxide-containing clay-like composition with the silver-containing clay-like composition.

The particle diameter of the copper oxide powder is preferably from 1 μm to 25 μm.

In this case, since the particle diameter of the copper oxide powder is equal to or less than 25 μm, a sintering property of the powder is secured, and it is possible to manufacture a sintered silver alloy body having excellent mechanical properties. Moreover, since the particle diameter of the copper oxide powder is equal to or larger than 1 μm, it is possible to reduce the manufacturing cost of the copper oxide powder to make it low.

To the copper oxide-containing clay-like composition of the present invention, at least any one of fatty substance and a surface active agent may be optionally further added.

The binder in the copper oxide-containing clay-like composition of the present invention may be constituted with a combination of at least 1 or 2 or more kinds among a cellulose-based binder, a polyvinyl compound-based binder, an acryl compound-based binder, a wax-based binder, a resin-based binder, starch, gelatin, and flour. In addition, among these, the binder is most preferably constituted with the cellulose-based binder, particularly a water-soluble cellulose.

There is no particular limitation on the type of the surface active agent, and normal surface active agents (for example, polyethylene glycol and the like) can be used.

Examples of the fatty substance include organic acids (oleic acid, stearic acid, phthalic acid, palmitic acid, sebacic acid, acetylcitric acid, hydroxybenzoic acid, lauric acid, myristic acid, caproic acid, enanthic acid, butyric acid and capric acid), organic acid esters (organic acid esters including a methyl group, an ethyl group, a propyl group, a butyl group, an octyl group, a hexyl group, a dimethyl group, a diethyl group, an isopropyl group or an isobutyl group), higher alcohols (octanol, nonanol, and decanol), polyhydric alcohols (glycerin, arabinitol, and sorbitan), and ethers (dioctyl ether and didecyl ether).

According to the present invention, it is possible to provide a method of manufacturing a sintered silver alloy body, which enables the simple manufacture of a sintered silver alloy body that has excellent tensile strength, bending strength (mechanical properties), elongation, and the like at a low cost, and to provide a copper oxide-containing clay-like composition that is suitable for the method of manufacturing the sintered silver alloy body.

DETAILED DESCRIPTION OF THE INVENTION

Hereinafter, the embodiments of the present invention will be described with reference to attached drawings.

In the present embodiment, a clay-like composition for forming a sintered silver alloy body (sintered body) is called clay for forming a sintered body, a silver-containing clay-like composition is called silver clay, and a copper oxide-containing clay-like composition is called copper oxide clay for the description.

A method of manufacturing a sintered silver alloy body and a copper oxide-containing clay-like composition as the first embodiment of the present invention will be described with reference to FIGS. 1, 2, and 3A to 3D.

In the method of manufacturing a sintered silver alloy body as the present embodiment, silver clay as base material is prepared. There is no particular limitation on the silver clay, and it is possible to use commercially available silver clay, for example, pure silver clay PMC 3 manufactured by Mitsubishi Materials Corporation. First, this silver clay will be described.

The silver clay is manufactured by kneading pure silver powder, a binder, and water. A surface active agent or fatty substance may be optionally added to the silver clay. Although there is no particular limitation on the binder, at least 1 or 2 or more kinds among a cellulose-based binder, a polyvinyl compound-based binder, an acryl compound-based binder, a wax-based binder, a resin-based binder, starch, gelatin, and flour are combined so as to be used as the binder. There is no particular limitation on the silver clay, the silver clay preferably includes 50 mass % to 95 mass % of the pure silver powder, 70 mass % to 95 mass % of the binder, and water as the remainder.

Next, the copper oxide clay that is used in the method of manufacturing a sintered silver alloy body as the present embodiment will be described.

The copper oxide clay as the present embodiment is obtained by adding a binder and water, and optionally a binding agent to which a surface active agent or fatty substance are added to the copper oxide powder.

A mixing ratio (mass ratio) B/A between the copper oxide powder (A) and the binder and water (B) is in a range of $2/10 \leq B/A \leq 3/10$. In the present embodiment, B/A is set to 2.5/10.

As the copper oxide powder, CuO powder is used in the present embodiment, and the particle diameter thereof is from 1 μm to 25 μm. If the average particle diameter of the CuO powder exceeds 25 μm, the sintering property of the powder deteriorates. Accordingly, a long baking time is required, and there is a probability that the workability of the sintered silver alloy body may be negatively affected, which is thus not preferable. Though the lower limit of the average particle diameter of the CuO powder is not particularly specified, from the viewpoint of the limitation of an apparatus and the industrially required production costs, the lower limit of the average particle diameter of the CuO powder is set to 1 μm.

Herein, as a method of measuring the average particle diameter of the copper oxide powder, a well-known microtrack method can be used, for example. In addition, in the present embodiment, d50 (median diameter) was taken as the average particle diameter.

In addition, in the present embodiment, a CuO powder reagent (manufactured by Kishida Chemical Co., Ltd.) having a purity of 97% or higher and an average particle diameter of 5 μm was used.

There is no particular limitation on the binder of the copper oxide powder, and it is possible to use an organic substance that can form a clay-like composition by binding to the copper oxide powder. For example, it is preferable to constitute the binder with a combination of at least 1 or 2 or more kinds among a cellulose-based binder, a polyvinyl compound-based binder, an acryl compound-based binder, a wax-based binder, a resin-based binder, starch, gelatin, and flour. In addition, in the above binders, it is most preferable to use the cellulose-based binder, particularly, water-soluble cellulose.

There is no particular limitation on the surface active agent, and normal surface active agents (for example, polyethylene glycol and the like) can be used.

In addition, there is no particular limitation on the type of the fatty substance, and examples thereof include organic acids (oleic acid, stearic acid, phthalic acid, palmitic acid, sebacic acid, acetylcitric acid, hydroxybenzoic acid, lauric acid, myristic acid, caproic acid, enanthic acid, butyric acid and capric acid), organic acid esters (organic acid esters including a methyl group, an ethyl group, a propyl group, a butyl group, an octyl group, a hexyl group, a dimethyl group, a diethyl group, an isopropyl group or an isobutyl group), higher alcohols (octanol, nonanol and decanol), polyhydric alcohols (glycerin, arabinitol and sorbitan), and ethers (dioctyl ether and didecyl ether).

Next, an example of a method of manufacturing the copper oxide clay as the present embodiment described above will be described with reference to a schematic view shown in FIG. 2.

The copper oxide clay as the present embodiment contains the copper oxide powder in a range from 70 mass % to 90 mass % and a binding agent including an organic binder and water in a range from 10 mass % to 30 mass %. Herein, to the binding agent, a surface active agent or fatty substance may be optionally added in addition to the organic binder and water.

Figure 1:
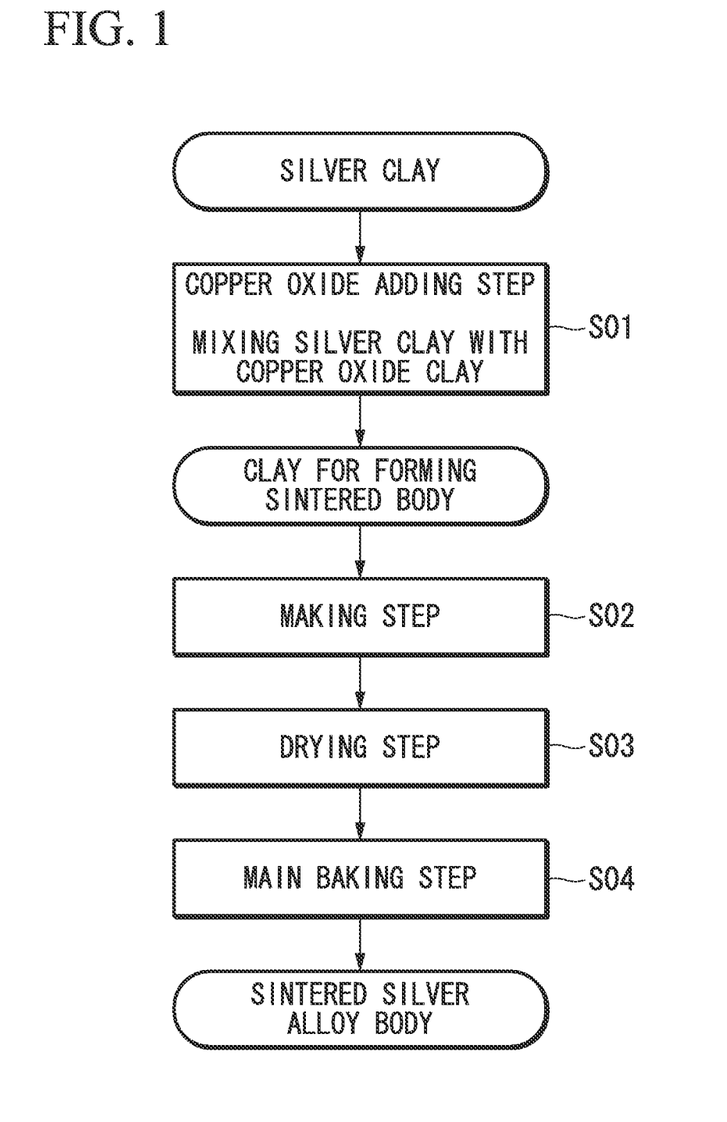
FIG. 1 is a view illustrating steps of manufacturing a copper oxide-containing clay-like composition that is used for a method of manufacturing a sintered silver alloy body as a first embodiment of the present invention.
Figure 2:
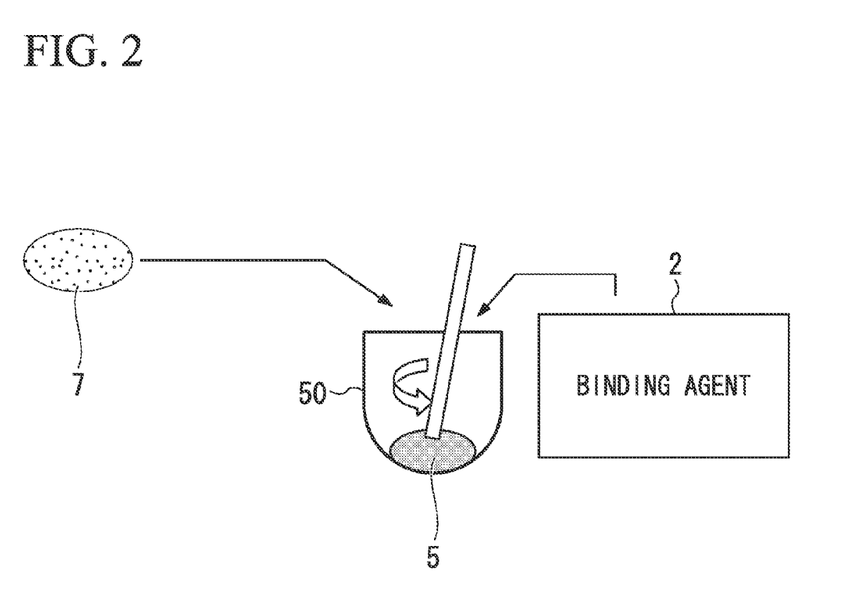
FIG. 2 is a flow diagram illustrating the method of manufacturing a sintered silver alloy body as the first embodiment of the present invention.

As shown in FIG. 2, in the method of manufacturing a copper oxide clay 5, which is described in the present embodiment, first, a CuO powder 1 is introduced to a mixing apparatus 50. At this time, the CuO powder 1 (average particle diameter of 5 μm measured by microtrack method; a reagent manufactured by Kishida Chemical Co., Ltd., purity of 97% or higher) is introduced.

Next, as shown in FIG. 2, a binding agent 2 is added to the copper oxide powder 1 in the mixing apparatus 50.

Herein, the binding agent 2 is obtained by mixing the organic binder (11 mass % to 17 mass %), the fatty substance (5 mass % or less), the surface active agent (2 mass % or less), and water as the remainder.

Thereafter, the copper oxide powder 1 and the binding agent 2 are mixed and kneaded in the mixing apparatus 50, thereby obtaining the copper oxide clay 5.

Next, the method of manufacturing a sintered silver alloy body as the present embodiment will be described.

First, in the method of manufacturing a sintered silver alloy body as the present embodiment, the above-described silver clay as base material (for example, pure silver clay PMC 3 manufactured by Mitsubishi Materials Corporation) is prepared.

Subsequently, this silver clay is mixed with the above-described copper oxide clay 5, thereby manufacturing the clay for forming a sintered body (copper oxide adding step S01). Herein, the silver clay is white in color, and the copper oxide clay is black in color. Accordingly, if the silver clay and the copper oxide clay are gently mixed, a marble pattern with two colors appears. Therefore, the silver clay and the copper oxide clay are mixed by being kneaded until the marble pattern cannot be visually confirmed. In this manner, the clay for forming a sintered body is manufactured.

Herein, in the present embodiment, the mixing ratio CuO/Ag between the CuO component and the silver component in the clay for forming a sintered body is 12/88≤CuO/Ag≤35/65, in terms of mass ratio.

Thereafter, the clay for forming a sintered body is made into an arbitrary shape to obtain an object 51 (making step S02). In the making step S02, the clay is shaped and made into an arbitrary shape by, for example, a mechanical process using a stamper, press molding, extrusion molding, or the like, or a manual process of a worker, thereby obtaining the object 51 shown in FIG. 3A.

Figure 3A:
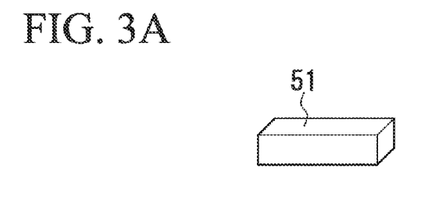
FIGS. 3A to 3D are views illustrating a baking step in the method of manufacturing a sintered silver alloy body as the first embodiment of the present invention.
Figure 3B:
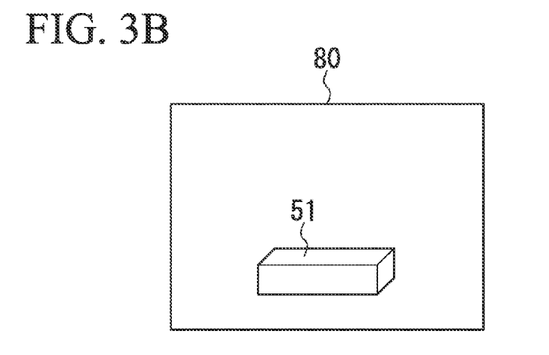

Next, as shown in FIG. 3B, the object 51 is introduced to an electric furnace 80, followed by drying treatment, thereby removing moisture or the like (drying step S03).

In the drying step S03, it is preferable that the drying temperature be set, for example, in a range from room temperature or about 80° C. to 150° C., from the viewpoint of an effective drying treatment. The time for performing drying treatment is set to, for example, a range from 30 minutes to 720 minutes, and more preferably 30 minutes to 90 minutes, from the same viewpoint. For example, the drying treatment can be carried out under a condition in which a drying temperature is about 100° C. and a drying time is about 60 minutes.

Figure 3C:
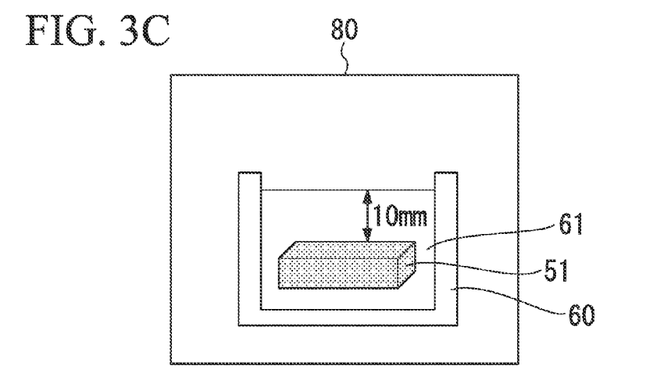

Thereafter, as shown in FIG. 3C, the dried object 51 is baked, thereby manufacturing a sintered silver alloy body 10 (main baking step S04).

In this main baking step S04, the object 51 is baked using an apparatus shown in FIG. 3C in the following manner. In addition, in the main baking step S04, by the use of the oxide of CuO included in the clay for forming a sintered body, the binder included in the clay for forming a sintered body is combusted and removed.

First, the object 51 is buried in activated carbon 61 charged into a ceramic baking container 60.

At this time, in order to prevent the object 51 from being completely buried and being exposed outside when the activated carbon is combusted, it is preferable to secure a distance of about 10 mm between the surface of the activated carbon 61 in the baking container 60 and the object 51.

Subsequently, the baking container 60 in which the object 51 has been buried in the activated carbon 61 is introduced to the electric furnace 80, and heated at a temperature in a range from 650° C. to 830° C. for 15 minutes to 120 minutes, thereby performing baking.

Figure 3D:
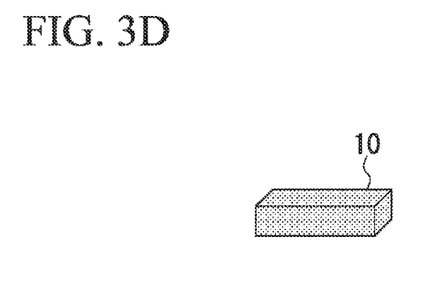

In this manner, the sintered silver alloy body 10 is manufactured. The sintered silver alloy body 10 is then subjected to post-processes such as surface polishing and decoration treatment, thereby obtaining various products.

According to the method of manufacturing a sintered silver alloy body and the copper oxide clay as the present embodiment constituted in this manner, the copper oxide adding step S01 is provided which manufactures the clay for forming a sintered body by adding the copper oxide clay to the silver clay as base material. Accordingly, the manufactured clay for forming a sintered body includes silver and copper oxide, and it is possible to greatly improve the mechanical properties of the sintered silver alloy body manufactured.

In addition, being chemically stable compared to a metal Cu, the copper oxide is less likely to be easily altered (the acid value of copper ions is less likely to change) in the atmosphere. Therefore, it is possible to suppress the discoloration over time of the clay for forming a sintered body obtained by the copper oxide adding step S01.

Moreover, since it is possible to remove the binder by using oxygen of the copper oxide included in the clay for forming a sintered body, baking can be promoted. Particularly, in the present embodiment, the CuO powder is used as the copper oxide powder, and the mixing ratio CuO/Ag between the CuO component and the silver component in the clay for forming a sintered body is CuO/Ag≥12/88 in terms of a mass ratio. Accordingly, even if the pre-baking step performed in the atmosphere is omitted, it is possible to reliably remove the binder. In addition, since a mixing ratio of CuO/Ag≤35/65 is taken, it is possible to inhibit an oxide from remaining inside the sintered silver alloy body.

In the present embodiment, the silver clay and the copper oxide clay are mixed in the copper oxide adding step S01. Accordingly, it is possible to simply manufacture the clay for forming a sintered body including silver and copper oxide.

Moreover, in the present embodiment, since the silver clay and the copper oxide clay are mixed to such a degree that a marble pattern can not be visually confirmed, it is possible to prevent the unevenness of baking and to manufacture a reliably baked sintered silver alloy body.

In the copper oxide clay in the present embodiment, the mixing ratio (mass ratio) B/A between the copper oxide powder (A) and the binder and water (B) is in a range of 2/10≤B/A≤3/10. Accordingly, it is possible to manufacture the clay for forming a sintered body that is excellent in formability, by simply mixing the copper oxide clay with the silver clay as base material. In addition, the binder is not included more than is necessary, and the binder is reliably removed in the main baking step. Therefore, it is possible to manufacture the sintered silver alloy body having excellent mechanical properties.

Figure 4:
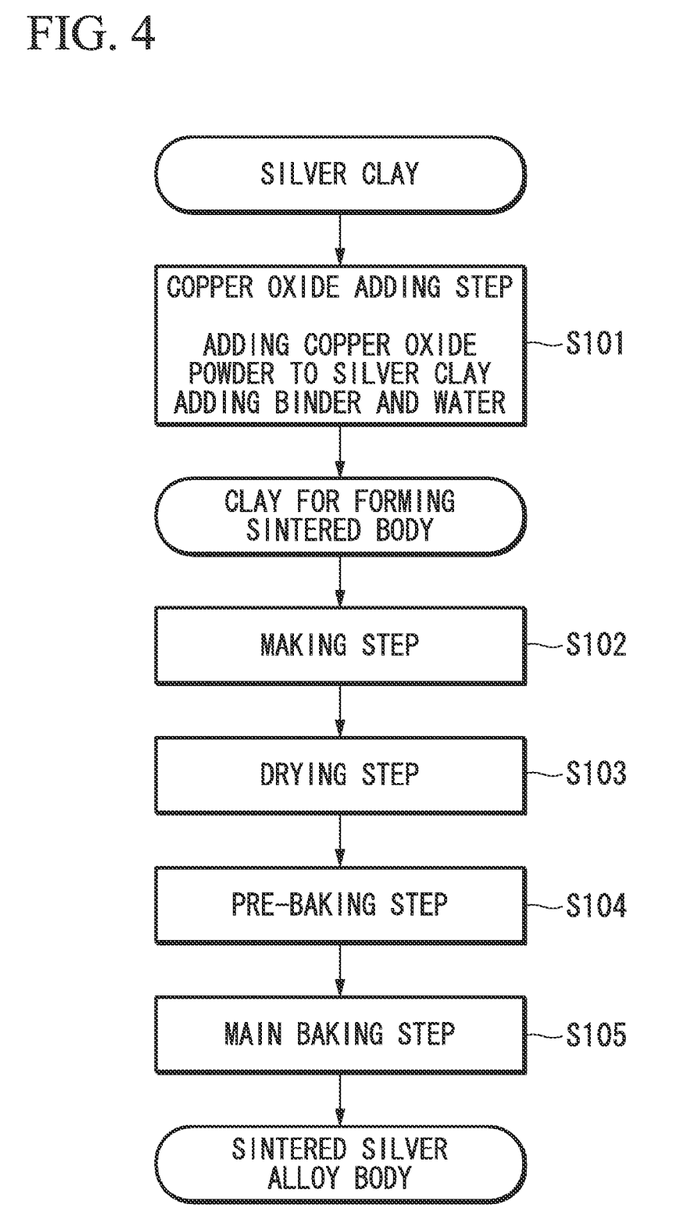
FIG. 4 is a flow diagram illustrating the method of manufacturing a sintered silver alloy body as a second embodiment of the present invention.

Next, the method of manufacturing a sintered silver alloy body and the copper oxide-containing clay-like composition as the second embodiment of the present invention will be described with reference to FIG. 4.

In the method of manufacturing a sintered silver alloy body as the present embodiment, the silver clay as base material (for example, pure silver clay PMC 3 manufactured by Mitsubishi Materials Corporation) is prepared. The same silver clay used in the first embodiment can be used as this silver clay.

First, copper oxide powder used in the method of manufacturing a sintered silver alloy body as the present embodiment will be described.

In the present embodiment, $Cu_2O$ powder is used as the copper oxide powder, and the particle diameter thereof is from 1 μm to 25 μm. If the average particle diameter of the $Cu_2O$ powder exceeds 25 μm, the sintering property of the powder deteriorates. Accordingly, there is a possibility that a long baking time may be required and that the workability of the sintered silver alloy body may be negatively affected, which is thus not preferable. Though the lower limit of the average particle diameter of the $Cu_2O$ powder is not particularly specified, from the viewpoint of the limitation of an apparatus and the industrially required production costs, the lower limit of the average particle diameter of the $Cu_2O$ powder is set to 1 μm.

Herein, as a method of measuring the average particle diameter of the copper oxide powder, a well-known microtrack method can be used, for example. In addition, in the present embodiment, d50 (median diameter) was taken as the average particle diameter.

In addition, in the present embodiment, a $Cu_2O$ powder reagent (manufactured by Kishida Chemical Co., Ltd.) having a purity of 97% or higher and an average particle diameter of 5 μm was used.

As the binder added together with the copper oxide powder, the same binder as in the first embodiment is applicable. Moreover, in addition to the binder, a surface active agent, fatty substance, and the like may be added appropriately. As the surface active agent and the fatty substance, the same ones as those in the first embodiment are applicable.

Next, the method of manufacturing a sintered silver alloy body as the present embodiment will be described.

First, in the method of manufacturing a sintered silver alloy body as the present embodiment, the above-described silver clay as base material (for example, pure silver clay PMC 3 manufactured by Mitsubishi Materials Corporation) is prepared.

Thereafter, the $Cu_2O$ powder is added to the silver clay, the binder and water are also added thereto, and the content of the binding agent in the clay for forming a sintered body is adjusted. At this time, a surface active agent or fatty substance may be appropriately added thereto. Subsequently, these are mixed together, thereby generating the clay for forming a sintered body (copper oxide adding step S101).

Herein, the amount of the $Cu_2O$ powder added is adjusted such that the mixing ratio $Cu_2O/Ag$ between the $Cu_2O$ component and the silver component in the clay for forming a sintered body becomes $3/7 \leq Cu_2O/Ag \leq 55/45$ in terms of a mass ratio.

Subsequently, the clay for forming a sintered body is made into an arbitrary shape to obtain an object (making step S102).

Thereafter, the object is introduced to an electric furnace, followed by performing a drying treatment, thereby removing moisture or the like (drying step S103).

Then the dried object is subjected to the pre-baking in the atmosphere by using the electric furnace (pre-baking step S104).

Thereafter, the object having undergone the pre-baking is baked in a reduction atmosphere, thereby manufacturing a sintered silver alloy body (main baking step S105).

Herein, the making step S102, the drying step S103, and the main baking step S105 can be performed in the same sequence as in the first embodiment.

In addition, in the pre-baking step S104, the pre-baking temperature is preferably set in a range from 350° C. to 600° C., and the pre-baking time is preferably set in a range of from 10 minutes to 60 minutes.

In this manner, the sintered silver alloy body as the present embodiment is manufactured. This sintered silver alloy body is then subjected to post-processes such as surface polishing and decoration treatment, thereby obtaining various products.

According to the method of manufacturing a sintered silver alloy body as the present embodiment constituted in this manner, the copper oxide adding step S101 is provided which manufactures the clay for forming a sintered body by adding the copper oxide powder to the silver clay as base material. Accordingly, the manufactured clay for forming a sintered body includes silver and copper oxide, and it is possible to greatly improve the mechanical properties of the sintered silver alloy body manufactured.

In addition, it is possible to suppress the discoloration of the clay for forming a sintered body that is obtained by the copper oxide adding step S101.

Moreover, it is possible to remove the binder by using oxide of the copper oxide included in the clay for forming a sintered body, whereby baking can be promoted.

In the present embodiment, since the copper oxide powder, binder, and water are mixed with the silver clay in the copper oxide adding step S101, it is possible to adjust the binder and water in consideration of the formability.

In addition, since the pre-baking step S104 is provided, it is possible to reliably remove the binder and to manufacture a sintered silver alloy body having excellent mechanical properties.

So far, the embodiments of the present invention have been described, but the invention is not limited thereto. The invention can be appropriately modified within a range that does not depart from the technical scope of the invention.

For example, in the above description, the pure silver clay PMC 3 manufactured by Mitsubishi Materials Corporation was used as the commercially available silver clay. However, the invention is not limited thereto, and other silver clays may be used.

In addition, in the first embodiment, although the copper oxide clay including the CuO powder was described for example, the invention is not limited thereto, and the copper oxide clay may include $Cu_2O$ powder. Alternatively, the copper oxide powder may include both the CuO powder and the $Cu_2O$ powder.

In the examples shown in FIGS. 3A to 3D, for the convenience of diagrammatic illustration and description, the object 51 obtained by making the clay for forming a sintered body 5 into a shape and the sintered silver alloy body 10 were formed into an approximate block shape. However, needless to say, the object 51 and the sintered silver alloy body 10 can be formed into various artistic shapes.

In addition, in the present embodiment, the example was described in which the electric furnace was used in the respective steps of the drying treatment and baking, but the invention is not limited thereto. For example, it is possible to use any apparatus such as a gas heating apparatus without limitation, as long as heating conditions of the apparatus can be stably controlled.

Example 1

Hereinafter, the method of manufacturing a sintered silver alloy body and the copper oxide-containing clay-like composition will be described in more detail by using examples. However, the present invention is not limited to the examples.

Examples of Present Invention

In Examples 1 to 6 of the present invention, copper oxide clay using CuO powder (average particle diameter of 5 μm measured by microtrack method; a reagent manufactured by Kishida Chemical Co., Ltd., purity of 97% or higher) was used.

In Examples 7 to 12 of the present invention, copper oxide clay using $Cu_2O$ powder (average particle diameter of 5 μm measured by microtrack method; a reagent manufactured by Kishida Chemical Co., Ltd., purity of 97% or higher) was used.

A binding agent including a binder and water was added to the CuO powder and the $Cu_2O$ powder, followed by kneading, thereby obtaining the above-described copper oxide clay.

The binding agent was obtained by mixing 15 mass % of methyl cellulose as an organic binder, 3 mass % of olive oil, which is a kind of an organic acid, as fatty substance, 1 mass % of polyethylene glycol as a surface active agent, and water as the remainder.

Next, as silver clay of base material, pure silver clay PMC 3 manufactured by Mitsubishi Materials Corporation was prepared, and this silver clay was mixed with the copper oxide powder in the mixing ratio shown in Tables 1 and 2. At this time, the mixture was kneaded until a marble pattern of the silver clay (white) and the copper oxide powder (black) was not visually confirmed any more. In this manner, the clay for forming a sintered body was manufactured.

The above-described clay for forming a sintered body was made into a wire-like object having dimensions of a diameter of about 1.2 mm and a length of about 50 mm and a prismatic object (before baking) having dimensions of a length of about 30 mm, a width of about 3 mm, and a thickness of about 3 mm.

Thereafter, each of the wire-like object and the prismatic object were simultaneously introduced to an electric furnace (Orton manufactured by Evenheat Kiln Inc.) for each example of the invention, followed by drying treatment under conditions in which the drying temperature was 100° C. and the drying time was 60 minutes, thereby removing moisture or the like included in the respective objects.

Subsequently, under the conditions shown in Tables 1 and 2, the pre-baking and the main baking were performed.

The pre-baking step was performed using the electric furnace in the atmosphere.

For the main baking step, a ceramic baking container in which activated carbon was charged was prepared, and the respective objects were buried in the activated carbon.

At this time, the distance from the surface of the activated carbon to the respective objects was set to about 10 mm.

Then the baking container in which the respective objects had been buried in the activated carbon was introduced to the electric furnace, and the main baking was performed. As a result, a wire-like sintered silver alloy body and a prismatic sintered silver alloy body were produced.

Comparative Example

In Comparative Examples 1 and 2, the commercially available pure silver clay was made into a shape and dried in the same sequence as in the above-described examples of the present invention, followed by baking under the conditions shown in Table 3 in the atmosphere, thereby producing silver sintered bodies.

In Comparative Example 3, silver clay using alloy powder (atomized powder) of Ag-7.5 mass % of Cu (Ag: 92.5 mass %, Cu: 7.5 mass %) was made into a shape, dried, and subjected to the pre-baking and main baking in the same sequence as in the examples of the present invention, thereby producing a sintered silver alloy body.

[Evaluation Method]

The produced sintered silver alloy body was measured in terms of density, tensile strength, bending strength, and elongation, by the following test methods. The measurement of the tensile strength and the elongation was performed using the wire-like sintered body, and the measurement of the density and bending strength was performed using the prismatic sintered body.

The density was measured using an automatic specific gravity measuring apparatus "ARCHIMEDES (driving unit: SA301, data-processing unit: SA601)" manufactured by Chou Balance Corp.

To determine the tensile strength, an AUTOGRAPH AG-X manufactured by Shimadzu Corporation was used as described above to measure a stress trajectory with a tensile rate of 5 mm/min, and the stress at a moment when a test specimen was broken was measured.

To determine the bending strength, an AUTOGRAPH AG-X manufactured by Shimadzu Corporation was used to measure a stress trajectory with a pushing rate of 0.5 mm/min, and the peak stress within the elastic range was measured.

In addition, to determine the elongation, an AUTOGRAPH AG-X manufactured by Shimadzu Corporation was used to measure a stress trajectory with a tension rate of 5 mm/min, and the elongation at a moment when a test specimen was broken was measured.

Lists of manufacturing conditions of the examples of the present invention and the comparative examples and the evaluation results are shown in Tables 1 to 3.

TABLE 1

| | | Weight of Ag clay (g) Weight of Ag powder (g) | Weight of CuO clay (g) Weight of CuO (g) powder | Grade (content rate of Ag; per mill) | Pre-baking | Main baking | Density g/cm$^3$ | Tensile strength N/mm$^2$ | Bending strength N/mm$^2$ | Elongation % |
|---|---|---|---|---|---|---|---|---|---|---|
| Example of present invention | 1 | 20.68 18.8 | 1.5 1.2 | Ag—5% Cu (950) | 500° C. × 0.5 h | 760° C. × 1 h | 8.86 | 179 | 129 | 21 |
| | 2 | 20.0 18.18 | 2.25 1.8 | Ag—7.5% Cu (925) | 500° C. × 0.5 h | 760° C. × 1 h | 9.12 | 184 | 146 | 22 |
| | 3 | 19.4 17.6 | 3.0 2.4 | Ag—10% Cu (900) | 500° C. × 0.5 h | 760° C. × 1 h | 9.37 | 210 | 158 | 25 |
| | 4 | 20.68 18.8 | 1.5 1.2 | Ag—5% Cu (950) | — | 760° C. × 1 h | 7.34 | 73 | 72 | 1 |
| | 5 | 20.0 18.18 | 2.25 1.8 | Ag—7.5% Cu (925) | — | 760° C. × 1 h | 7.77 | 151 | 91 | 12 |
| | 6 | 19.4 17.6 | 3.0 2.4 | Ag—10% Cu (900) | — | 760° C. × 1 h | 8.71 | 185 | 154 | 13 |

TABLE 2

| | | Weight of Ag clay (g) Weight of Ag powder (g) | Weight of Cu$_2$O clay (g) Weight of Cu$_2$O powder (g) | Grade (content rate of Ag; per mill) | Pre-baking | Main baking | Density g/cm$^3$ | Tensile strength N/mm$^2$ | Bending strength N/mm$^2$ | Elongation % |
|---|---|---|---|---|---|---|---|---|---|---|
| Example of | 7 | 20.15 18.32 | 2.1 1.68 | Ag—7.5% Cu (925) | 500° C. × 0.5 h | 760° C. × 1 h | 8.52 | 178 | 131 | 14 |

TABLE 2-continued

|  |  | Weight of Ag clay (g) Weight of Ag powder (g) | Weight of Cu$_2$O clay (g) Weight of Cu$_2$O powder (g) | Grade (content rate of Ag; per mill) | Pre-baking | Main baking | Density g/cm$^3$ | Tensile strength N/mm$^2$ | Bending strength N/mm$^2$ | Elongation % |
|---|---|---|---|---|---|---|---|---|---|---|
| present invention | 8 | 19.58 17.8 | 2.75 2.2 | Ag—10% Cu (900) | 500° C. × 0.5 h | 760° C. × 1 h | 8.61 | 181 | 155 | 15 |
|  | 9 | 14.74 13.4 | 8.25 6.6 | Ag—30% Cu (700) | 500° C. × 0.5 h | 760° C. × 1 h | 8.79 | 216 | 206 | 26 |
|  | 10 | 20.15 18.32 | 2.1 1.68 | Ag—7.5% Cu (925) | — | 760° C. × 1 h | 7.21 | 71 | 66 | 2 |
|  | 11 | 19.58 17.8 | 2.75 2.2 | Ag—10% Cu (900) | — | 760° C. × 1 h | 7.98 | 148 | 102 | 10 |
|  | 12 | 14.74 13.4 | 8.25 6.6 | Ag—30% Cu (700) | — | 760° C. × 1 h | 8.57 | 201 | 189 | 19 |

TABLE 3

|  |  | Weight of Ag clay (g) Weight of Ag powder (g) | Weight of Ag—7.5% Cu clay (g) Weight of Ag—7.5% Cu powder (g) | Grade (content rate of Ag; per mill) | Pre-baking | Main baking | Density g/cm$^3$ | Tensile strength N/mm$^2$ | Bending strength N/mm$^2$ | Elongation % |
|---|---|---|---|---|---|---|---|---|---|---|
| Comparative Example | 1 | 22.00 20.00 | — — | Ag (999) | — | 700° C. × 10 min* | 7.58 | 75 | 71 | 15 |
|  | 2 | 22.00 20.00 | — — | Ag (999) | — | 900° C. × 2 h* | 9.12 | 146 | 44 | 36 |
|  | 3 | — — | 24.00 20.00 | Ag—7.5% Cu (925) | 500° C. × 0.5 h | 800° C. × 1 h | 8.47 | 160 | 120 | 7.2 |

*the main baking in Comparative Examples 1 and 2 was performed in the atmosphere.

[Evaluation Results]

It was confirmed that the mechanical properties greatly improved in Examples 1 to 3 and 7 to 9 of the present invention in which the pre-baking was performed, compared to Comparative Examples 1 and 2. Moreover, the mechanical properties of those examples were equal to or better than Comparative Example 3 including the alloy powder of Ag-7.5 mass % of Cu. From these results, it was confirmed that mixing copper oxide with the silver clay as base material greatly improved the mechanical properties of the sintered silver alloy body.

As shown in Examples 4 to 6 of the present invention in which the pre-baking step was omitted, the elongation or the like was insufficient in Example 4 of the present invention, but the improvement of the mechanical properties was confirmed in Examples 5 and 6 of the present invention. From these results, it was confirmed that when the CuO powder is used, it is possible to omit the pre-baking step, by setting a component ratio CuO/Ag between Ag and CuO at the time of mixing the silver clay with the copper oxide clay to CuO/Ag≥12/88.

Similarly, as shown in Examples 10 to 12 of the present invention in which the pre-baking step was omitted, the elongation or the like was insufficient in Example 10 of the present invention, but the improvement of the mechanical properties was confirmed in Examples 11 and 12 of the present invention. From these results, it was confirmed that when the Cu$_2$O powder is used, it is possible to omit the pre-baking step, by setting a component ratio Cu$_2$O/Ag between Ag and Cu$_2$O at the time of mixing the silver clay with the copper oxide clay to Cu$_2$O/Ag≥3/7.

Example 2

Next, the copper oxide powder was added to the commercially available silver clay to manufacture the clay for forming a sintered body, and a sintered silver alloy body was manufactured using this clay for forming a sintered body.

In Examples 13 to 16 of the present invention, only the copper oxide powder was added to the silver clay, as shown in Tables 4 and 5.

In Examples 17 to 20 of the present invention, the copper oxide powder and a binding agent were added to the silver clay, as shown in Tables 6 and 7. The binding agent used in Examples 17 to 20 of the present invention was obtained by mixing 15 mass % of methyl cellulose as an organic binder, 3 mass % of olive oil, which is a kind of organic acid, as fatty substance, 1 mass % of polyethylene glycol as a surface active agent, and water as the remainder.

As the silver clay of base material, pure silver clay PMC 3 manufactured by Mitsubishi Materials Corporation was prepared. The copper oxide powder or the like was added to the silver clay in the mixing ratio shown in Tables 4 to 7, thereby obtaining the clay for forming a sintered body.

In Examples 13, 14, 17 and 18 of the present invention, CuO powder (average particle diameter of 5 μm measured by microtrack method; a reagent manufactured by Kishida Chemical Co., Ltd., purity of 97% or higher) was prepared as the copper oxide powder.

In Examples 15, 16, 19, and 20 of the present invention, Cu$_2$O powder (average particle diameter of 5 μm measured by microtrack method; a reagent manufactured by Kishida Chemical Co., Ltd., purity of 97% or higher) was prepared as the copper oxide powder.

The above-described clay for forming a sintered body was made into a shape, dried, and subjected to the pre-baking (omitted in Examples 14, 16, 18, and 20 of the present invention) and main baking in the same manner as in Examples 1 to 12 of the present invention.

The properties of the manufactured sintered silver alloy body were evaluated in the same manner as in Example 1. The manufacturing conditions and the evaluation results of Examples 13 to 20 of the present invention are shown in Tables 4 to 7.

TABLE 4

| | | Weight of Ag clay (g) Weight of Ag powder (g) | Weight of CuO powder (g) | Grade (content rate of Ag; per mill) | Pre-baking | Main baking | Density g/cm³ | Tensile strength N/mm² | Bending strength N/mm² | Elongation % |
|---|---|---|---|---|---|---|---|---|---|---|
| Example of present invention | 13 | 19.4 17.6 | 2.4 | Ag—10% Cu (900) | 500° C. × 0.5 h | 760° C. × 1 h | 9.06 | 201 | 149 | 22 |
| | 14 | 19.4 17.6 | 2.4 | Ag—10% Cu (900) | — | 760° C. × 1 h | 8.78 | 190 | 146 | 11 |

TABLE 5

| | | Weight of Ag clay (g) Weight of Ag powder (g) | Weight of Cu₂O powder (g) | Grade (content rate of Ag; per mill) | Pre-baking | Main baking | Density g/cm³ | Tensile strength N/mm² | Bending strength N/mm² | Elongation % |
|---|---|---|---|---|---|---|---|---|---|---|
| Example of present invention | 15 | 14.74 13.4 | 6.6 | Ag—30% Cu (700) | 500° C. × 0.5 h | 760° C. × 1 h | 8.53 | 180 | 168 | 15 |
| | 16 | 14.74 13.4 | 6.6 | Ag—30% Cu (700) | — | 760° C. × 1 h | 8.03 | 159 | 132 | 10 |

TABLE 6

| | | Weight of Ag clay (g) Weight of Ag powder (g) | Weight of CuO powder (g) | Weight of binding agent (g) | Grade (content rate of Ag; per mill) | Pre-baking | Main baking | Density g/cm³ | Tensile strength N/mm² | Bending strength N/mm² | Elongation % |
|---|---|---|---|---|---|---|---|---|---|---|---|
| Example of present invention | 17 | 19.4 17.6 | 2.4 | 0.6 | Ag—10% Cu (900) | 500° C. × 0.5 h | 760° C. × 1 h | 9.23 | 201 | 150 | 24 |
| | 18 | 19.4 17.6 | 2.4 | 0.6 | Ag—10% Cu (900) | — | 760° C. × 1 h | 8.82 | 181 | 160 | 13 |

TABLE 7

| | | Weight of Ag clay (g) Weight of Ag powder (g) | Weight of Cu₂O powder (g) | Weight of binding agent (g) | Grade (content rate of Ag; per mill) | Pre-baking | Main baking | Density g/cm³ | Tensile strength N/mm² | Bending strength N/mm² | Elongation % |
|---|---|---|---|---|---|---|---|---|---|---|---|
| Example of present invention | 19 | 14.74 13.4 | 6.6 | 1.65 | Ag—30% Cu (700) | 500° C. × 0.5 h | 760° C. × 1 h | 8.77 | 208 | 185 | 22 |
| | 20 | 14.74 13.4 | 6.6 | 1.65 | Ag—30% Cu (700) | — | 760° C. × 1 h | 8.57 | 186 | 180 | 16 |

As shown in Tables 4 to 7, even when the copper oxide powder was added to the silver clay, and the binding agent was optionally added thereto, without the use of the copper oxide clay, it was possible to improve the mechanical properties of the sintered silver alloy body, similarly to Examples of the present invention 1 to 12 in which the copper oxide clay was used. Moreover, it was confirmed that the sintered silver alloy body having sufficient mechanical properties was manufactured even if the pre-baking was omitted.

What is claimed is:

1. A copper oxide-containing clay-like composition comprising: copper oxide powder; a binder; and water, wherein a mixing ratio (mass ratio) B/A between the copper oxide powder (A) and the binder and water (B) is in a range of $2/10 \leq B/A \leq 3/10$.

2. The copper oxide-containing clay-like composition according to claim 1, wherein the copper oxide powder includes CuO powder.

3. The copper oxide-containing clay-like composition according to claim 1, wherein the average particle diameter of the copper oxide powder is from 1 μm to 25 μm.

4. The copper oxide-containing clay-like composition according to claim 1, further comprising at least any one of a fatty substance and a surface active agent.

5. The copper oxide-containing clay-like composition according to claim 1, wherein the binder is constituted with a combination of at least 1 or 2 or more kinds among a cellulose-based binder, a polyvinyl compound-based binder, an acryl compound-based binder, a wax-based binder, a resin-based binder, starch, gelatin, and flour.

* * * * *